Nov. 25, 1930.  C. A. PARKER  1,782,476
HOSE CLAMP
Filed June 29, 1929
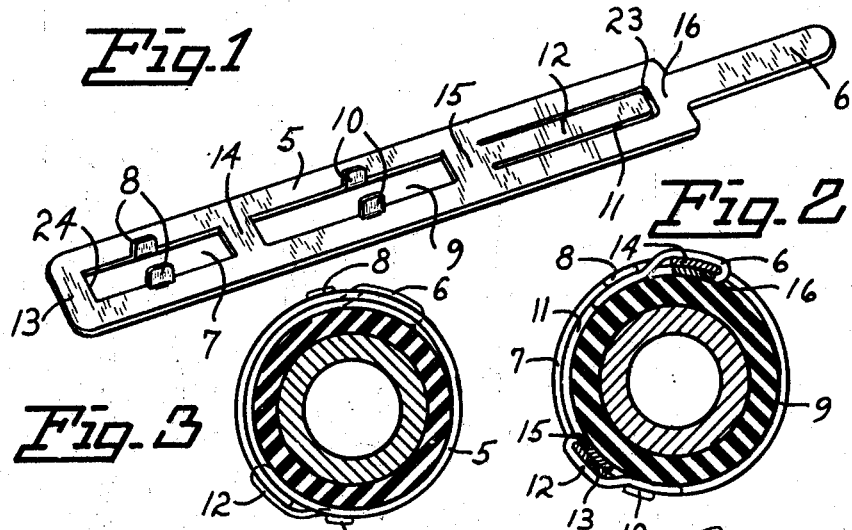
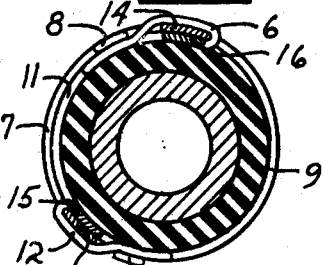
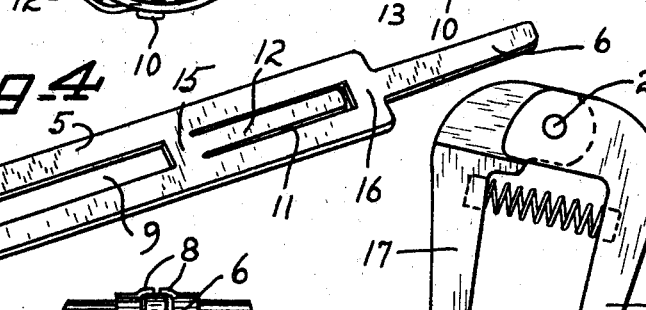
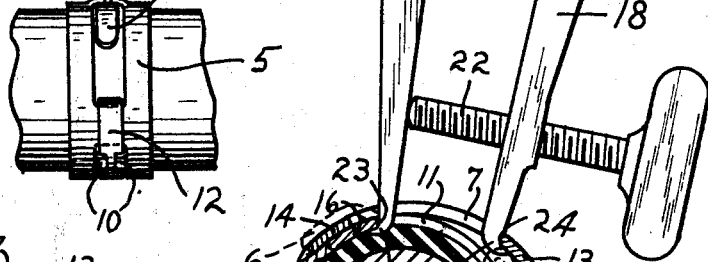
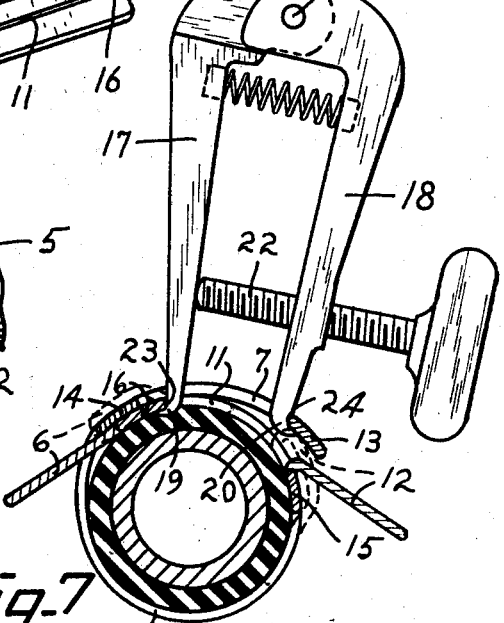
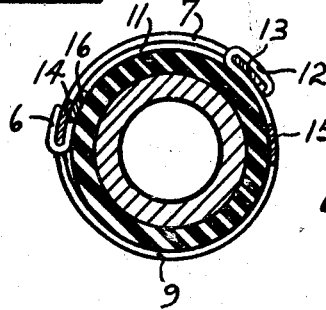
INVENTOR.
Charles A. Parker
BY Glenn L. Fish
ATTORNEYS.

Patented Nov. 25, 1930

1,782,476

UNITED STATES PATENT OFFICE

CHARLES A. PARKER, OF HAUGAN, MONTANA

HOSE CLAMP

Application filed June 29, 1929. Serial No. 374,690.

My invention relates to hose clamps and certain objects of the invention are to provide a clamp of simple construction that may be made at comparatively small cost and which may be used in connection with water, steam, air, or any other hose coupling. Further objects are to provide in combination with said hose clamp a spreader tool adapted to be used for tightening said clamp on the hose.

With the above and other objects in view which will appear as the description proceeds, the invention consists of the novel construction, adaptation, combination and arrangement of parts hereinafter described and claimed. These objects are accomplished by devices illustrated in the accompanying drawings, wherein:

Figure 1 is a view in perspective of the hose clamp in the open or outstretched position;

Figure 2 is a view in transverse section of the device in its installed position;

Figure 3 is a view in transverse section of a hose and showing the device in end elevation clamped thereon;

Figure 4 is a view in perspective of the hose clamp with the holding lugs eliminated;

Figure 5 is a view in side elevation of the clamp installed on a hose;

Figure 6 is a view in transverse section of the clamp shown in Figure 4 in the installed position; and Figure 7 is a view in transverse section showing the application of a tool that is used when installing the clamp on a hose.

Referring to the drawings throughout which like reference numerals designate like parts, the numeral 5 indicates the main body portion of the clamp which is in the form of a strap and has one of its ends reduced to form a tongue 6.

The end portion of the body 5 farthest from the strap 6 is provided with a slot 7 having holding lugs 8 projecting from its lateral edges. A similar and longer slot 9 having holding lugs 10 is provided at the middle portion of said strap body. The end portion of said body nearest the tongue 6 is provided with a third slot 11 and the metal is left in this slot with its inner end intact thus forming a tongue 12.

The portion of metal at the end of the body 5 outside of the slot 7 is designated by the numeral 13, and the metal portion between the slots 7 and 9 is indicated by the numeral 14. Between the slots 9 and 11 the metal portion is designated by the numeral 15 while between the slot 11 and tongue 6 the metal portion is indicated by the numeral 16. It will be obvious that the hose clamp shown in Figure 4 of the drawings is similar in all respects to the clamp shown in Figure 1 with the exception that the holding lugs 8 and 10 are omitted.

For installing my hose clamp a spreader tool, such as shown in Figure 7 is used. Said tool comprises a pair of legs 17 and 18 having hooked toes 19 and 20 respectively. Said legs are pivoted at 21 and a screw 22 provides means whereby the legs may be forcibly spread apart.

To install the clamp on a hose the tongue end portion is first placed against the hose with the tongue 6 at a tangent therewith. The body portion 5 is then bent around the hose until said tongue projects through the slot 9 and with the slot 7 overlapping the slot 11 as clearly shown in Figure 7 of the drawings.

The spreader tool is then applied with its toes 19 and 20 projecting through the slots 7 and 11 and bearing against the shoulder 23 of the slot 11, and with its toe 20 against the shoulder 24 of the slot 7, thus the spring S holds the toes 19 and 20 firmly engaged in the overlapping slots 7 and 11, the tongue 12 being previously bent back out of the way. When the legs of the tool are forced apart by the action of the thumb screw 22, tongue 6 is traveling through slot 9 and when the clamp is drawn to the desired tension tongue 6 is bent up and back over the metal portion 14 which is held by the hand until the tool is removed. The tongue 6 is then bent downward in the open overlapping slots 7 and 11 as shown in dotted lines in Figure 7. The tongue 12 is then passed under the end 13 through slot 7 and bent down into slot 9 between lugs 10.

The lugs 8 and 10 are now bent downwardly to hold the end portions of the tongues 6 and 12 respectively in place. It will now be apparent that I have provided a simple and economical means for effectively clamping hose on couplings, which are adjustable to different sizes of hose, strong and durable in construction, and are neat in appearance, having no projections to catch on foreign bodies.

Thus having described my invention it being understood that minor changes may be resorted to in its construction without departing from its scope and spirit, what I claim and desire to secure by Letters Patent of the United States is:—

1. A hose clamp comprising a strap body, a tongue, said body having a middle slot and a slot at each end portion thereof, said tongue adapted to be received by the middle slot when the device is disposed in the installed position, a tongue within the slot nearest the tongue end portion of the body, and said last named tongue adapted to be received by the slot remotest therefrom when the device is in its installed position.

2. A hose clamp comprising a strap body, a tongue, said body having a middle slot and a slot at each end portion of the body, said tongue adapted to be received by the middle slot when the device is disposed in the installed position, a tongue within the slot nearest the tongue end portion of the body, said last named tongue adapted to be received by the slot remotest therefrom, and lugs projecting from the edges of the middle slot and the slot remotest from the tongue end portion of the body adapted to be bent to hold the end portions of the two tongues in place in the installed position.

In testimony whereof I affix my signature.

CHARLES A. PARKER.